United States Patent
Nakagawa et al.

(10) Patent No.: US 10,264,194 B2
(45) Date of Patent: Apr. 16, 2019

(54) INFORMATION PROCESSING DEVICE, INFORMATION PROCESSING METHOD, AND PROGRAM

(71) Applicant: SONY CORPORATION, Tokyo (JP)

(72) Inventors: Takaaki Nakagawa, Kanagawa (JP); Rio Yamasaki, Tokyo (JP); Hideo Okamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/559,162

(22) PCT Filed: Mar. 15, 2016

(86) PCT No.: PCT/JP2016/058066
§ 371 (c)(1),
(2) Date: Sep. 18, 2017

(87) PCT Pub. No.: WO2016/152634
PCT Pub. Date: Sep. 29, 2016

(65) Prior Publication Data
US 2018/0070025 A1     Mar. 8, 2018

(30) Foreign Application Priority Data
Mar. 26, 2015   (JP) ................................ 2015-064805

(51) Int. Cl.
*H04N 5/272*  (2006.01)
*H04N 5/232*  (2006.01)
(Continued)

(52) U.S. Cl.
CPC ............... *H04N 5/272* (2013.01); *G06T 7/70* (2017.01); *G06T 7/90* (2017.01); *G11B 27/036* (2013.01);
(Continued)

(58) Field of Classification Search
CPC ...... H04N 5/272; H04N 5/2628; H04N 9/643; H04N 5/232; H04N 5/23219; G06T 7/90;
(Continued)

(56) References Cited

U.S. PATENT DOCUMENTS

2012/0249812 A1* 10/2012 Li .................... G06K 9/00758
                                                                348/208.1
2012/0314077 A1* 12/2012 Clavenna, II ...... H04N 21/2187
                                                                348/159
(Continued)

FOREIGN PATENT DOCUMENTS

JP   2000-172826   6/2000
JP   2004-328788   11/2004
(Continued)

*Primary Examiner* — Michael Lee
(74) *Attorney, Agent, or Firm* — Paratus Law Group, PLLC

(57) ABSTRACT

There is provided an information processing device, an information processing method, and a program that enable easy generation of a motion picture in which performers imaged at different locations have been composited in a balanced manner. Processing of performing an image analysis on a second motion picture to set, as an analysis result, a position of a second subject appearing in the second motion picture, and on the basis of the analysis result, adjusting, as a compositing condition, a composited position at which a first motion picture is composited into the second motion picture avoiding a first subject from overlapping the second subject is performed. Moreover, processing of setting, as an analysis result, a face size of a first person appearing in the first motion picture as the first subject and a face size of a second person appearing in the second motion picture as the second subject.

18 Claims, 9 Drawing Sheets

(51) Int. Cl.
*G06T 7/90* (2017.01)
*G06T 7/70* (2017.01)
*H04N 5/262* (2006.01)
*H04N 9/64* (2006.01)
*G11B 27/036* (2006.01)
*G11B 27/28* (2006.01)

(52) U.S. Cl.
CPC ............. *G11B 27/28* (2013.01); *H04N 5/232* (2013.01); *H04N 5/23219* (2013.01); *H04N 5/2628* (2013.01); *H04N 9/643* (2013.01); *G06T 2207/10016* (2013.01); *G06T 2207/30168* (2013.01); *G06T 2207/30201* (2013.01)

(58) Field of Classification Search
CPC ............. G06T 7/70; G06T 2207/10016; G06T 2207/30168; G06T 2207/30201
USPC .......................................................... 348/587
See application file for complete search history.

(56) References Cited

U.S. PATENT DOCUMENTS

| | | | |
|---|---|---|---|
| 2013/0235224 A1* | 9/2013 | Park | H04N 5/23222 348/218.1 |
| 2015/0181265 A1* | 6/2015 | Clavenna | H04N 21/2187 348/159 |
| 2018/0091706 A1* | 3/2018 | Gay | H04N 9/75 |

FOREIGN PATENT DOCUMENTS

| | | |
|---|---|---|
| JP | 2005-094741 A | 4/2005 |
| JP | 2010-130040 | 6/2010 |
| JP | 2011-172103 | 9/2011 |
| JP | 2013-197980 | 9/2013 |
| WO | WO2014/013689 A1 | 1/2014 |

\* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/058066 (filed on Mar. 15, 2016) under 35 U.S.C. § 371, which claims priority to Japanese Patent Application No. 2015-064805 (filed on Mar. 26, 2015), which are all hereby incorporated by reference in their entirety.

TECHNICAL FIELD

The present disclosure relates to an information processing device, an information processing method, and a program, and more particularly relates to an information processing device, an information processing method, and a program that enable easy generation of a motion picture in which performers imaged at different locations have been composited in a balanced manner.

BACKGROUND ART

Conventionally, in the chroma key compositing technology used in movies and television broadcasting, a performer is imaged mainly using a green background or a blue background as a background. Then, after performing work of cutting out the performer from the imaged motion picture, an operation of compositing the performer using a separately prepared motion picture as a background and correcting or adjusting such that the performer becomes an appropriate size and is located at an appropriate position is performed. In addition, in a case of compositing in real time and broadcasting, a structure of compositing-destination video and a structure of imaging the performer need to be matched.

For example, Patent Literature 1 discloses a compositing method of, on the basis of data that indicates an appropriate human compositing layout matched with contents of a motion picture to be a background, adjusting the position and size of a human portion cut out from an imaged motion picture in accordance with the contents of the motion picture to be a background.

CITATION LIST

Patent Literature

Patent Literature 1: JP 2004-328788A

DISCLOSURE OF INVENTION

Technical Problem

However, since the compositing method disclosed in the Patent Literature 1 requires an effort to register data that indicates the human compositing layout, various efforts are required in order to generate a motion picture in which performers imaged at different locations have been composited in a balanced manner. Therefore, it is requested to generate, by easier means, a motion picture in which performers imaged at different locations have been composited in a balanced manner.

The present disclosure was made in view of such circumstances, and enables easy generation of a motion picture in which performers imaged at different locations have been composited in a balanced manner.

Solution to Problem

An information processing device according to an aspect of the present disclosure includes an adjusting unit configured to, on the basis of an analysis result obtained by at least one of an image analysis on an area in which a first subject appears included in a first motion picture and an image analysis on a second motion picture different from the first motion picture, adjust a compositing condition for compositing the first motion picture and the second motion picture.

An information processing method or a program according to an aspect of the present disclosure includes a step of, on the basis of an analysis result obtained by at least one of an image analysis on an area in which a first subject appears included in a first motion picture and an image analysis on a second motion picture different from the first motion picture, adjusting a compositing condition for compositing the first motion picture and the second motion picture.

In an aspect of the present disclosure, on the basis of an analysis result obtained by at least one of an image analysis on an area in which a first subject appears included in a first motion picture and an image analysis on a second motion picture different from the first motion picture, a compositing condition for compositing the first motion picture and the second motion picture is adjusted.

Advantageous Effects of Invention

According to an aspect of the present disclosure, a motion picture in which performers imaged at different locations have been composited in a balanced manner can be generated easily.

MODE(S) FOR CARRYING OUT THE INVENTION

Hereinafter, specific embodiments applying the present technology will be described in detail with reference to the drawings.

Figure 1:
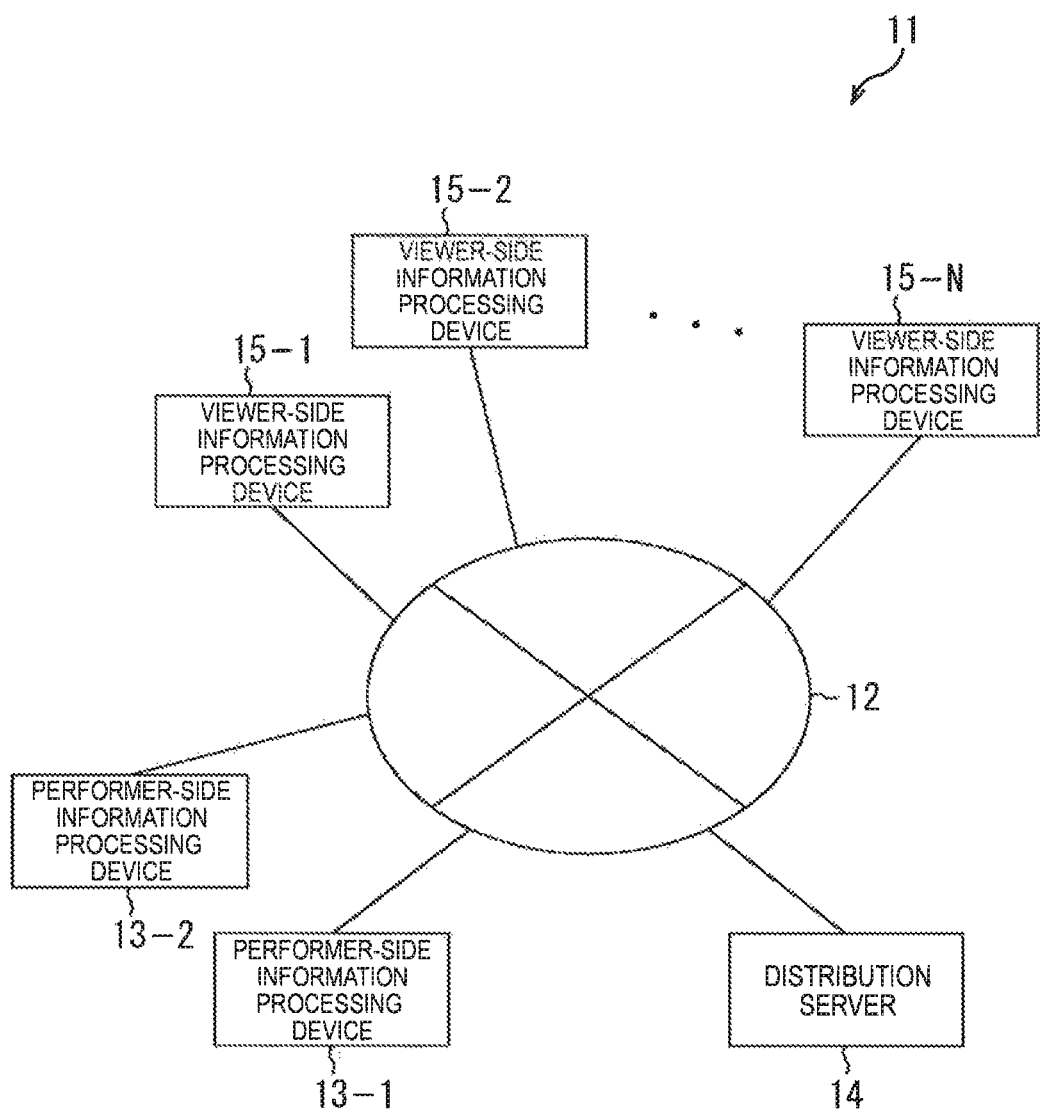
FIG. 1 is a block diagram illustrating an exemplary configuration of an embodiment of a distribution system applying the present technology.

FIG. 1 is a block diagram illustrating an exemplary configuration of an embodiment of a distribution system applying the present technology.

As illustrated in FIG. 1, a distribution system 11 includes performer-side information processing devices 13-1 and 13-2, a distribution server 14, and N viewer-side information processing devices 15-1 to 15-N, which are connected to each other via a network 12 such as the Internet.

In the distribution system 11, a motion picture imaged in the performer-side information processing device 13-1 or 13-2, for example, is transmitted sequentially to the distribution server 14 via the network 12, and is distributed from the distribution server 14 to the viewer-side information processing devices 15-1 to 15-N via the network 12. This allows viewers of the viewer-side information processing devices 15-1 to 15-N to view the motion picture in which a user of the performer-side information processing device 13-1 or 13-2 is appearing as a performer.

Moreover, in the distribution system 11, a composite motion picture in which a performer of the performer-side information processing device 13-1 and a performer of the performer-side information processing device 13-2 have been composited can be distributed. For example, the performer-side information processing device 13-2 transmits a motion picture obtained by imaging the performer to the performer-side information processing device 13-1 via the distribution server 14. Then, the performer-side information processing device 13-1 generates a composite motion picture in which the performer of the performer-side information processing device 13-1 has been composited so as to be aligned next to the performer appearing in the motion picture transmitted from the performer-side information processing device 13-2, for example, and transmits the composite motion picture to the distribution server 14. Accordingly, a composite motion picture in which performers imaged at different locations have been composited is distributed to the viewer-side information processing devices 15-1 to 15-N via the distribution server 14.

Figure 2:
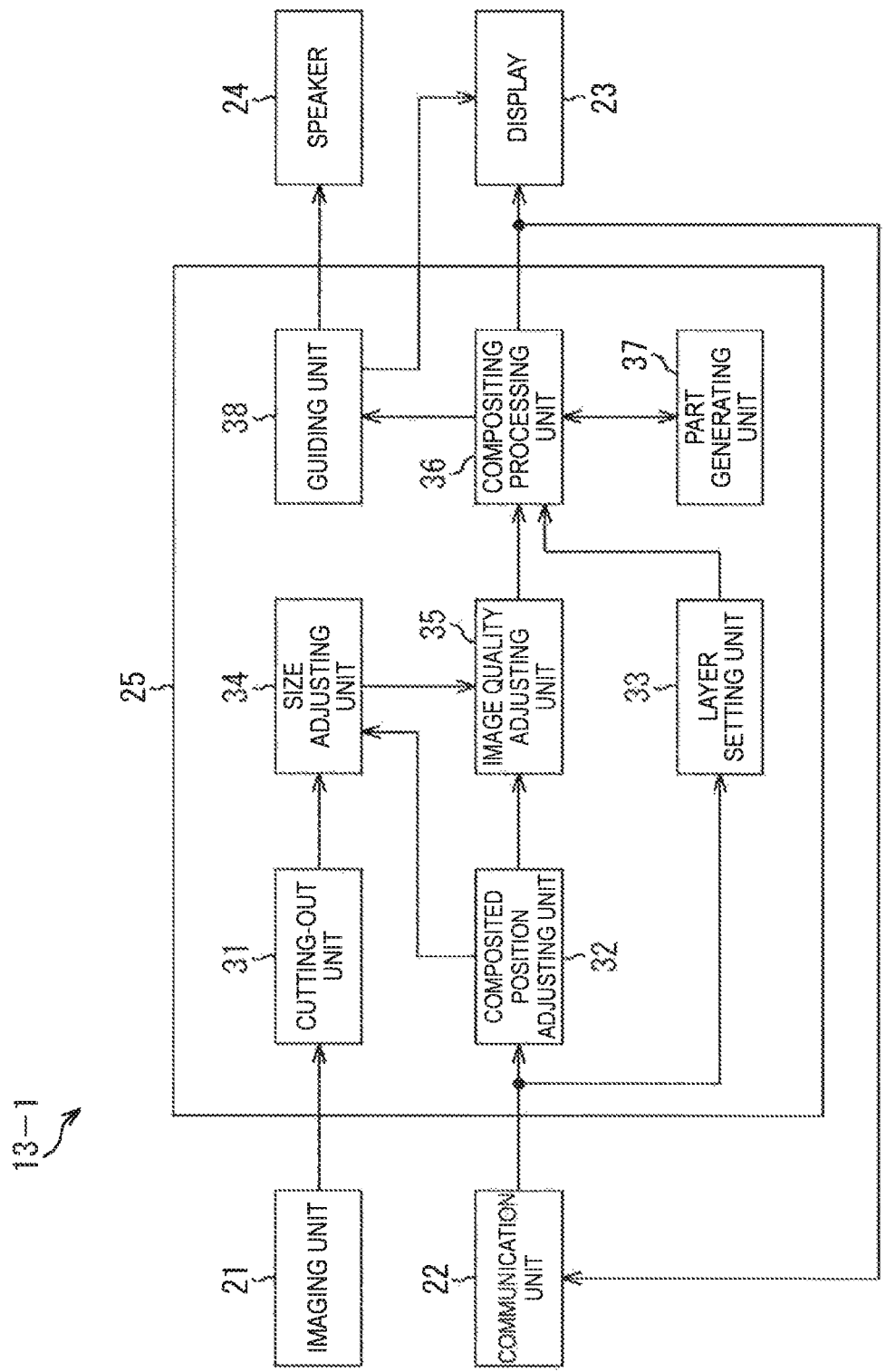
FIG. 2 is a block diagram illustrating an exemplary configuration of a performer-side information processing device.

Next, FIG. 2 is a block diagram illustrating an exemplary configuration of the performer-side information processing device 13-1.

As illustrated in FIG. 2, the performer-side information processing device 13-1 includes an imaging unit 21, a communication unit 22, a display 23, a speaker 24, and an image processing unit 25.

The imaging unit 21 includes an optical system and an imaging sensor, neither illustrated in the drawing, and supplies a motion picture in which the performer of the performer-side information processing device 13-1 has been imaged as a subject to the image processing unit 25.

The communication unit 22 performs communication with the performer-side information processing device 13-2 and the distribution server 14 via the network 12. For example, the communication unit 22 receives a motion picture transmitted from the performer-side information processing device 13-2 to supply the motion picture to the image processing unit 25, and transmits a composite motion picture output from the image processing unit 25 to the distribution server 14.

The display 23 displays a composite motion picture supplied from a compositing processing unit 36 of the image processing unit 25, and displays a guiding image supplied from a guiding unit 38 of the image processing unit 25.

The speaker 24 outputs a guiding sound supplied from the guiding unit 38 of the image processing unit 25.

The image processing unit 25 performs image processing of cutting out a performer from a motion picture imaged by the imaging unit 21 (hereinafter referred to as an imaged motion picture as necessary) and compositing the performer into a motion picture (hereinafter referred to as a compositing-destination motion picture as necessary) supplied from the communication unit 22. Then, the image processing unit 25 supplies a composite motion picture generated by performing the image processing to the communication unit 22 and the display 23. In addition, as illustrated in the drawing, the image processing unit 25 includes a cutting-out unit 31, a composited position adjusting unit 32, a layer setting unit 33, a size adjusting unit 34, an image quality adjusting unit 35, the compositing processing unit 36, a part generating unit 37, and the guiding unit 38.

The cutting-out unit 31 performs face detection processing and human detection processing on the imaged motion picture supplied from the imaging unit 21 to detect a performer appearing in the imaged motion picture (hereinafter referred to as an imaged performer as necessary). Then, the cutting-out unit 31 performs image processing of cutting out an area in which the imaged performer appears from the imaged motion picture, and generates a cut-out motion picture of the imaged performer formed along the contour of the imaged performer (a motion picture of an area in which the imaged performer appears, included in the imaged motion picture) to supply the cut-out motion picture to the size adjusting unit 34.

The composited position adjusting unit 32 adjusts such that a composited position (compositing condition) when compositing the cut-out motion picture of the imaged performer generated by the cutting-out unit 31 into a compositing-destination motion picture is arranged appropriately, and sets the composited position in the compositing-destination motion picture. For example, as will be described later with reference to FIG. 3, the composited position adjusting unit 32 performs an image analysis on a compositing-destination motion picture supplied from the communication unit 22 to recognize a performer appearing in the compositing-destination motion picture (hereinafter referred to as a compositing-destination performer as necessary). This allows the composited position adjusting unit 32 to obtain the position of the compositing-destination performer appearing in the compositing-destination motion picture as an analysis result. Then, on the basis of the analysis result, the composited position adjusting unit 32 adjusts the composited position such that the imaged performer is arranged in a balanced manner with respect to the compositing-destination performer, considering the composition when the imaged performer and the compositing-destination performer are aligned.

The layer setting unit 33 performs object detection processing on the compositing-destination motion picture supplied from the communication unit 22, and sets, in the compositing-destination motion picture, a layer showing an ahead or behind positional relationship of an object detected from the compositing-destination motion picture with the imaged performer, as will be described later with reference to FIG. 4.

The size adjusting unit 34 performs image processing of adjusting the size (compositing condition) when compositing a cut-out motion picture of the imaged performer supplied from the cutting-out unit 31 at the composited position in the compositing-destination motion picture, and supplies the cut-out motion picture of the imaged performer adjusted in size to the image quality adjusting unit 35. For example, considering the face size of the imaged performer and the face size of the compositing-destination performer, the size of the cut-out motion picture of the imaged performer is adjusted such that their sizes are substantially identical, as will be described later with reference to FIG. 5. That is, the size adjusting unit 34 performs an image analysis on the cut-out motion picture of the imaged performer and the compositing-destination motion picture to obtain, as an analysis result, the face size of the imaged performer in the cut-out motion picture of the imaged performer and the face size of the compositing-destination performer appearing in the compositing-destination motion picture, and adjusts the size of the cut-out motion picture of the imaged performer on the basis of the analysis result.

The image quality adjusting unit 35 performs image processing of adjusting the image quality of the cut-out motion picture of the imaged performer when compositing into the compositing-destination motion picture (for example, compositing conditions, such as color characteristics including lightness, saturation, and hue, and resolution), in accordance with the image quality of the compositing-destination performer in the compositing-destination motion picture, and supplies the cut-out motion picture to the compositing processing unit 36. For example, in a case where the imaged performer has been imaged against light, the image quality adjusting unit 35 performs image processing of increasing the brightness of the cut-out motion picture of the imaged performer considering the balance in brightness between the imaged performer and the compositing-destination performer, as will be described later with reference to FIG. 7. That is, the image quality adjusting unit 35 performs an image analysis on the cut-out motion picture of the imaged performer and the compositing-destination motion picture to obtain the image qualities of the respective performers as an analysis result, and adjusts the image quality of the cut-out motion picture of the imaged performer on the basis of the analysis result.

The compositing processing unit 36 performs compositing processing of superimposing and compositing the cut-out motion picture of the imaged performer on the compositing-destination motion picture to generate a composite motion picture. At this time, the compositing processing unit 36 composites the cut-out motion picture of the imaged performer of the image quality adjusted by the image quality adjusting unit 35 at the composited position set in the compositing-destination motion picture by the composited position adjusting unit 32 in the size adjusted by the size adjusting unit 34. Moreover, in a case where a layer showing an ahead positional relationship with the imaged performer has been set by the layer setting unit 33 for an object detected from the compositing-destination motion picture, the compositing processing unit 36 cuts out the object for which the layer has been set from the compositing-destination motion picture, and after compositing the cut-out motion picture of the imaged performer, superimposes the motion picture obtained by cutting out the object.

In a case where a portion of the body of the imaged performer composited into the compositing-destination motion picture is missing as a result of the compositing processing unit 36 performing a composition analysis on the composite motion picture, the part generating unit 37 generates a part (complementary image) for complementing the missing portion (missing part) and supplies the part to the compositing processing unit 36, as will be described later with reference to FIG. 5. Accordingly, the compositing processing unit 36 performs compositing processing of compositing the part generated by the part generating unit 37 so as to hide the missing part of the imaged performer.

The guiding unit 38 performs an image analysis on the composite motion picture generated by the compositing processing unit 36, and on the basis of the analysis result, outputs guidance that provides various instructions (presents instructions) for the imaged performer such that the imaged performer and the compositing-destination performer do not become unnatural, as will be described later with reference to FIG. 6. For example, the guiding unit 38 supplies a guiding image that instructs the orientation of the imaged performer, instructs the position at which the imaging unit 21 is to be arranged, or instructs the brightness of the surrounding environment in which the imaged performer is being imaged to the display 23 for display, or supplies a guiding sound to the speaker 24 for output.

The performer-side information processing device 13-1 is configured as described above, and a composite motion picture in which the imaged performer and the compositing-destination performer have been composited in a balanced manner considering the balance in position, size, and the like between the imaged performer and the compositing-destination performer can be generated in the image processing unit 25. Moreover, in the performer-side information processing device 13-1, image processing in the image processing unit 25 is performed sequentially in accordance with the supply of an imaged motion picture obtained by the imaging unit 21 imaging the imaged performer to the image processing unit 25, and a composite motion picture can be output in real time with imaging of the imaged performer (including some time lag caused by the processing). Then, the composite motion picture output from the image processing unit 25 is transmitted to the distribution server 14 via the communication unit 22, and is distributed to the viewer-side information processing devices 151 to 15-N via the network 12.

Next, with reference to FIG. 3, composited position adjusting processing by the composited position adjusting unit 32 will be described.

Figure 3:
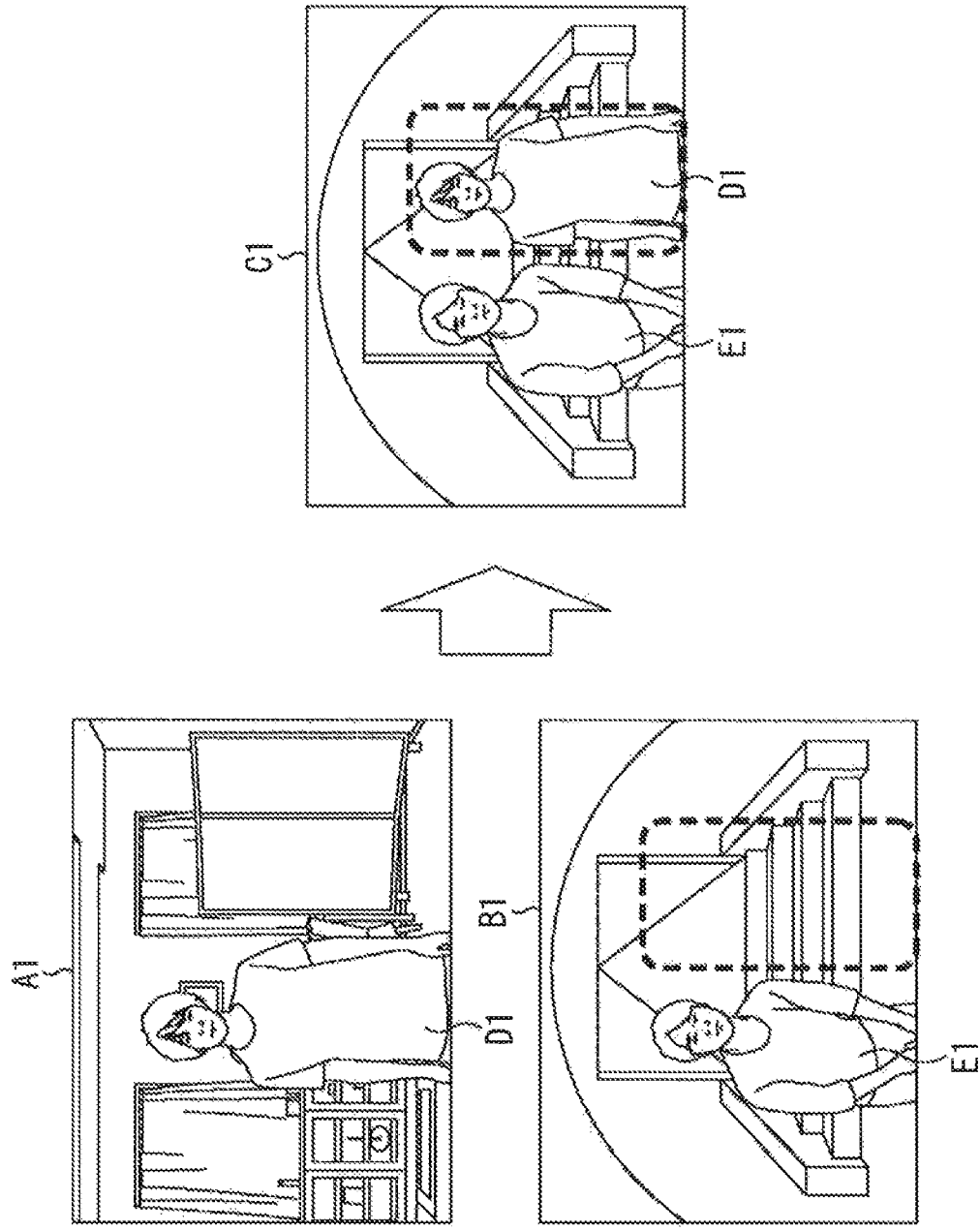
FIG. 3 is a view describing composited position adjusting processing.

Shown on the left side of FIG. 3 are an imaged motion picture A1 imaged by the imaging unit 21 and a compositing-destination motion picture B1 transmitted from the performer-side information processing device 13-2, and shown on the right side of FIG. 3 is a composite motion picture C1 having been subjected to compositing processing by the compositing processing unit 36.

As illustrated in the drawing, a case where the position of an imaged performer D1 in the imaged motion picture A1 and the position of a compositing-destination performer E1 in the compositing-destination motion picture B1 have such a positional relationship that they overlap each other will be described. In this case, if the imaged performer D1 is cut out from the imaged motion picture A1 and composited as it is without performing a position adjustment, the imaged performer D1 will be composited so as to overlap the compositing-destination performer E1, and although not illustrated in the drawing, a composite motion picture in which the compositing-destination performer E1 is hidden behind the imaged performer D1 will be generated. Therefore, conventionally, the imaged performer D1 is required to change the standing position during imaging while fully grasping the compositing-destination motion picture B1 such that the compositing-destination performer E1 is not hidden, and appropriate positioning cannot be performed easily.

In contrast, in the performer-side information processing device 13-1, the composited position adjusting unit 32 can perform an image analysis (for example, human detection processing, face detection processing, composition recognition, etc.) on the compositing-destination motion picture 131 to specify the position of the compositing-destination performer E1 appearing in the compositing-destination motion picture B1. Then, the composited position adjusting unit 32 can adjust the composited position of the imaged performer D1 so as to achieve an appropriate arrangement that avoids the imaged performer D1 from overlapping the compositing-destination performer E1. In the example of FIG. 3, the composited position adjusting unit 32 sets an initial composited position in such an arrangement that aligns next to the compositing-destination performer E1, as indicated by a broken line in the compositing-destination motion picture B1.

In this manner, in the image processing unit 25, the composited position of the imaged performer D1 is set to achieve an appropriate arrangement automatically by the composited position adjusting unit 32, that is, without the need for the imaged performer D1 to adjust the standing position of his/her own. This allows the image processing unit 25 to easily generate the composite motion picture C1 in which the compositing-destination performer E1 and the imaged performer D1 have been arranged so as not to overlap each other.

Note that, for example, in a case where distance information has been added to the compositing-destination motion picture B1, the composited position adjusting unit 32 can correctly recognize the position of the compositing-destination performer E1 by using that distance information, and can set the composited position more appropriately. In addition, in a case of compositing two or more performers, for example, the composited position adjusting unit 32 can also similarly adjust the composited position in such an appropriate arrangement that the respective performers do not overlap one another.

Next, with reference to FIG. 4, layer setting processing by the layer setting unit 33 will be described.

Figure 4:
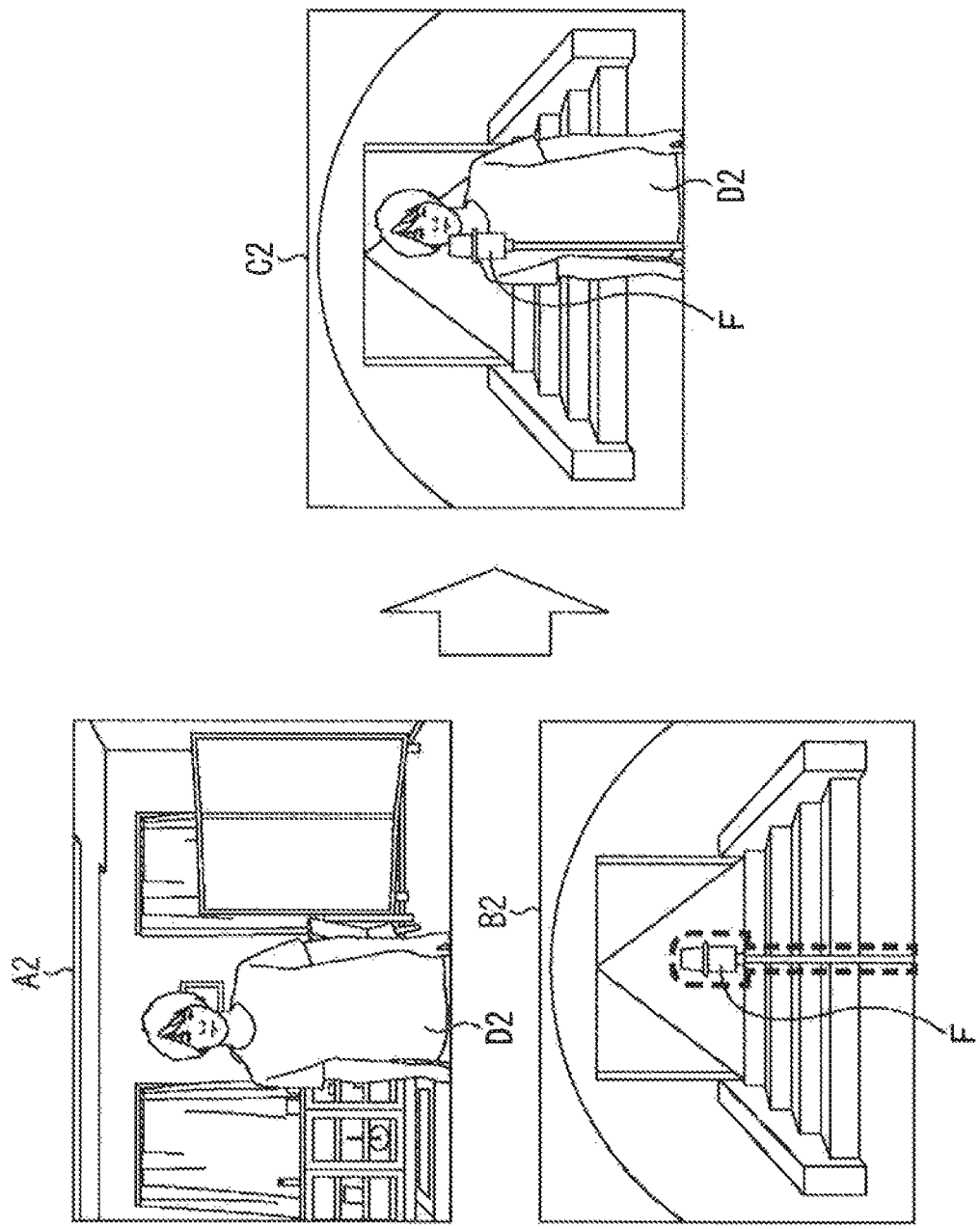
FIG. 4 is a view describing layer setting processing.

Shown on the left side of FIG. 4 are an imaged motion picture A2 imaged by the imaging unit 21 and a compositing-destination motion picture 132 transmitted from the performer-side information processing device 13-2, and shown on the right side of FIG. 4 is a composite motion picture C2 having been subjected to compositing processing by the compositing processing unit 36.

As illustrated in the drawing, a case where the position of an imaged performer D2 in the imaged motion picture A2 and the position of an object F (in the example of FIG. 4, a microphone stand) appearing in the compositing-destination motion picture 132 have a positional relationship of overlapping each other will be described. In this case, if the imaged performer D2 is cut out from the imaged motion picture A2 and composited as it is, the object F will be composited so as to overlap the compositing-destination performer E1, and although not illustrated in the drawing, a composite motion picture in which the ahead-behind relationship is inversed such that the object F is hidden behind the imaged performer D1 will be generated. That is, although a composition in which the object F is arranged ahead of the imaged performer D1 is originally desirable, a composite motion picture of such a composition cannot be easily generated.

Therefore, in the performer-side information processing device 13-1, the layer setting unit 33 performs object detection processing on the compositing-destination motion picture B2 to set a layer showing the ahead-behind relationship of the object F with the imaged performer D2 in the compositing-destination motion picture 132. For example, the layer setting unit 33 causes the display 23 to display an area surrounding the object F (area illustrated by the broken line) detected from the compositing-destination motion picture 132 as an area for which the layer can be set. Then, the layer setting unit 33 can cause the display 23 to display a graphical user interface for instructing whether to display the area ahead of or behind the imaged performer D2, and can set a layer in accordance with a user operation.

Moreover, in a case where the distance to a subject appearing in the compositing-destination motion picture B2 has been obtained using a distance-measuring technology and the distance information has been added to the compositing-destination motion picture B2, the layer setting unit 33 can set a layer referring to the distance information. For example, the layer setting unit 33 sets a layer ahead of the imaged performer D2 if the distance to the object F is less than a predetermined value, and sets a layer behind the imaged performer D2 if the distance to the object F is more than or equal to the predetermined value.

In this manner, in the image processing unit 25, a layer is set by the layer setting unit 33 for the object F that should be displayed ahead of the imaged performer D1. This allows the image processing unit 25 to generate the composite motion picture C2 of an originally desirable composition in which the object F is arranged ahead of the imaged performer D1.

Next, with reference to FIG. 5, size adjusting processing by the size adjusting unit 34 and part generation processing by the part generating unit 37 will be described.

Figure 5:
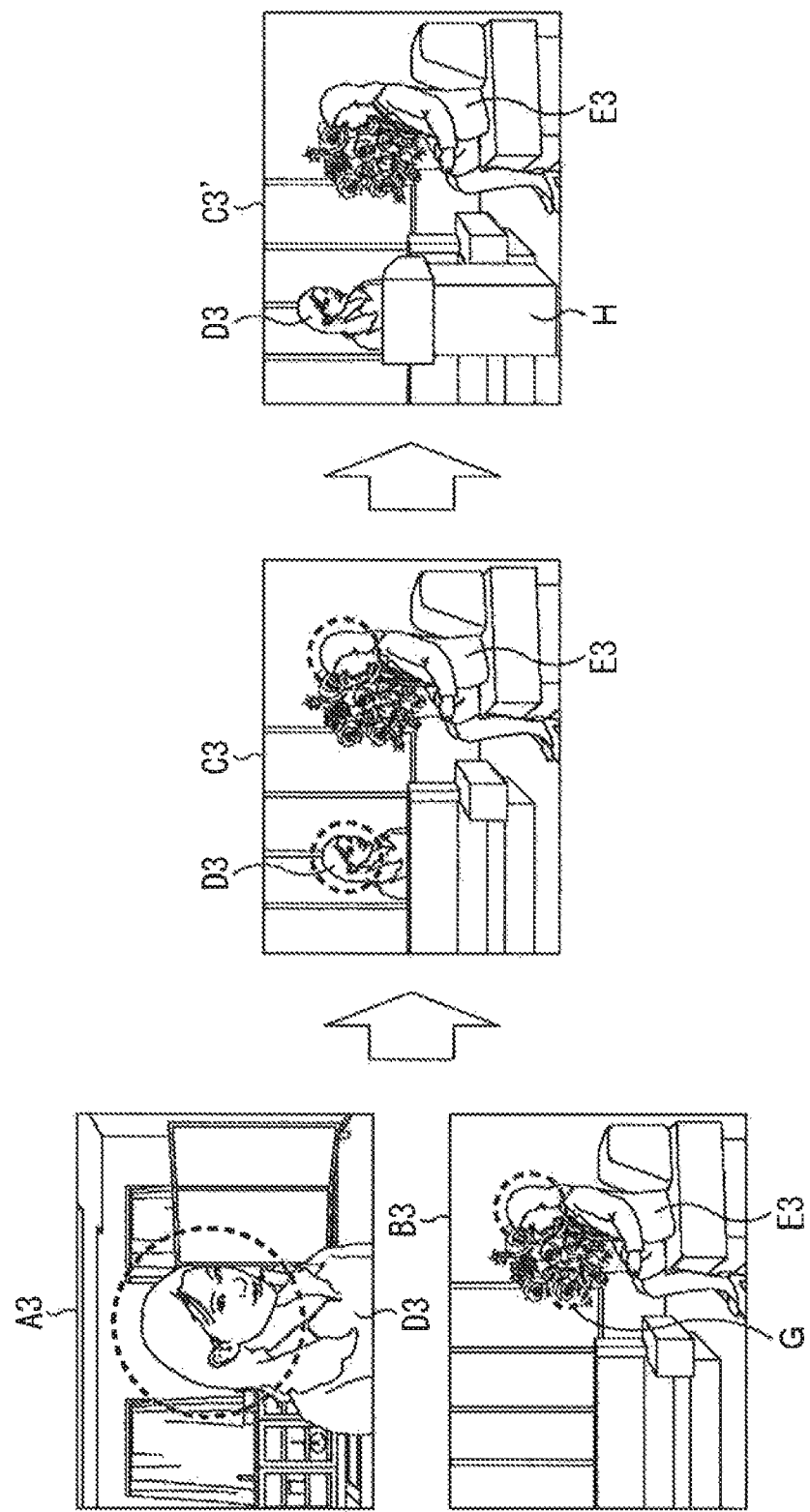
FIG. 5 is a view describing size adjusting processing and part generation processing.

Shown on the left side of FIG. 5 are an imaged motion picture A3 imaged by the imaging unit 21 and a compositing-destination motion picture B3 transmitted from the performer-side information processing device 13-2. Moreover, shown at the center of FIG. 5 is a composite motion picture C3 having been subjected to the size adjusting processing by the size adjusting unit 34 and the compositing processing by the compositing processing unit 36, and shown on the right side of FIG. 5 is a composite motion picture C3' in which a part generated in the part generating unit 37 has been composited into the composite motion picture C3.

As illustrated in the drawing, a case where an imaged performer D3 in the imaged motion picture A3 appears larger than the imaged performer D3 in the compositing-destination motion picture B3 will be described. In this case, if the imaged performer D3 is cut out from the imaged motion picture A3 and composited as it is without performing a size adjustment, the imaged performer D3 will be extremely large with respect to a compositing-destination performer E3, and an unbalanced composite motion picture will be generated, although not illustrated in the drawing. Therefore, the imaged performer D3 is conventionally required to move to a standing position away from the imaging unit 21 so as to be a size similar to the compositing-destination performer E3.

In contrast, in the performer-side information processing device 13-1, the face size of the compositing-destination performer E3 appearing in the compositing-destination motion picture B3 can be recognized when the composited position adjusting unit 32 sets a composited position, and can be notified to the size adjusting unit 34. Then, the size adjusting unit 34 performs image processing of performing a size adjustment (scale-up operation or scale-down operation) on the imaged performer D3 such that the face size of the imaged performer D3 (the circle indicated by the broken line) supplied from the cutting-out unit 31 becomes substantially identical to the face size of the compositing-destination performer E3 (the circle indicated by the broken line).

Note that, for example, in a case where the ratio between the size of an object G (in the example of FIG. 4, a flower) and the face size appearing in the compositing-destination motion picture B3 has previously been set in the compositing-destination motion picture B3, the size adjusting unit 34 may compare the face size of the imaged performer D3 and the size of the object G, and on the basis of the comparison result, may adjust the size of the imaged performer D3. In addition, a size comparison with a chair or a table besides the flower as illustrated in the drawing may be performed.

Accordingly, by compositing the imaged performer D3 adjusted in size by the size adjusting unit 34 into the compositing-destination motion picture B3 in the compositing processing unit 36, the composite motion picture C3 in which the imaged performer D3 and the compositing-destination performer E3 have been composited in a balanced manner can be generated.

Meanwhile, only an upper portion with respect to the chest of the imaged performer D3 has been imaged in the imaged motion picture A3, while the whole body of the compositing-destination performer E3 has been imaged in the compositing-destination motion picture I33. Thus, in a case of compositing in an arrangement in which the imaged performer D3 and the compositing-destination performer E3 are aligned at the face level as illustrated in the composite motion picture C3, a portion of the body of the imaged performer D3 not having been imaged (a lower portion with respect to the chest) becomes a missing part. Thus, the composite motion picture C3 is in such an unnatural state in which the upper portion with respect to the chest of the imaged performer D3 is floating in the air.

Therefore, in the performer-side information processing device 13-1, the compositing processing unit 36 performs a skeleton estimate on the imaged performer D3 composited into the composite motion picture C3 to recognize the missing part (in the example of FIG. 5, the lower portion with respect to the chest) of the imaged performer D3. Then, the compositing processing unit 36 requests the part generating unit 37 to generate a part that compensates for the recognized missing part of the imaged performer D3. For example, when performing image recognition on the composite motion picture C3 and recognizing the floor under the imaged performer D3, the compositing processing unit 36 requests the part generating unit 37 for a part to be arranged on the floor to hide the missing part of the imaged performer D3.

Correspondingly, the part generating unit 37 generates a part H (in the example of FIG. 5, a podium) that meets the request from the compositing processing unit 36 by computer graphics, and supplies the part to the compositing processing unit 36. Then, the compositing processing unit 36 generates the composite motion picture C3' in which the part H generated by the part generating unit 37 has been composited to be arranged on the floor in the composite motion picture C3 to compensate for the missing part of the imaged performer D3.

In this manner, in the image processing unit 25, a size adjustment of the imaged performer D3 is performed by the size adjusting unit 34, and the part H generated by the part generating unit 37 is composited so as to hide the missing part of the imaged performer D3. This allows the image processing unit 25 to generate the composite motion picture C3' that avoids bringing the imaged performer D3 into an unnatural state.

Next, with reference to FIG. 6, guiding processing by the guiding unit 38 will be described.

Figure 6:
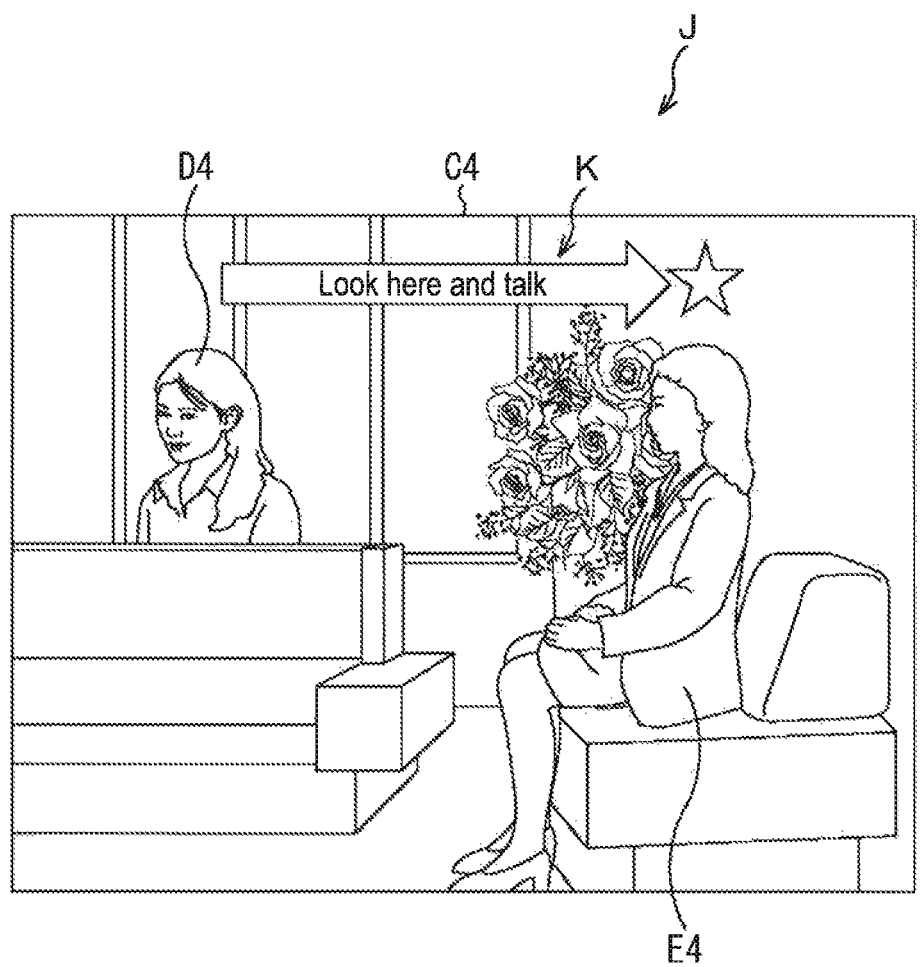
FIG. 6 is a view describing guiding processing.

FIG. 6 shows a displayed image J displayed on the display 23. The displayed image J in which a guiding image K output from the guiding unit 38 has been superimposed on a composite motion picture C4 output from the compositing processing unit 36 is displayed on the display 23.

For example, as illustrated in the drawing, a case where an imaged performer D4 of the performer-side information processing device 13-1 is not directed toward a compositing-destination performer E4 will be described. Since an unnatural state cannot be avoided appropriately in this case by the position adjusting processing and the size adjusting processing as described above, the guiding unit 38 performs guidance for providing various instructions for the imaged performer D4.

For example, the guiding unit 38 detects the faces of the imaged performer D4 and the compositing-destination performer E4 by analyzing the composite motion picture C4 supplied from the compositing processing unit 36, and recognizes the orientation of each face. Then, the guiding unit 38 outputs, to the display 23, the guiding image K including an arrow indicating the direction of the compositing-destination performer E4 and a message reading "Look here and talk" so as to achieve a composition in which a natural conversation is being performed. Note that the guiding image K is merely displayed on the display 23 overlapping the composite motion picture C4, and is not transmitted via the communication unit 22.

In this manner, in the image processing unit 25, the guiding unit 38 can perform guidance for the imaged performer D4 by means of the guiding image K so as to achieve such a composition in which the imaged performer D4 and the compositing-destination performer E4 are performing a conversation, for example. This allows the image processing unit 25 to generate the composite motion picture C4 of a less uncomfortable natural composition with respect to the imaged performer D4 and the compositing-destination performer E4.

Note that the guiding unit 38 can output such guidance that instructs installation of the imaging unit 21 to the imaged performer D4 of the performer-side information processing device 13-1, for example, in addition to instructing the face orientation of the imaged performer D4 and the compositing-destination performer E4 as illustrated in FIG. 6. Specifically, the guiding unit 38 can cause the display 23 to display or cause the speaker 24 to output a message reading "Raise the height of the camera", "Place the camera slightly to the right", "Move slightly away from the camera", or the like.

Moreover, the guiding unit 38 can analyze the white balance of the imaged performer D4, and in a case where it is detected that imaging is performed at an extremely dark place, can cause the display 23 to display or cause the speaker 24 to output guidance that points out the darkness of the room to brighten the room, for example, a message reading "Brighten the room."

Next, with reference to FIG. 7, image quality adjusting processing by the image quality adjusting unit 35 will be described.

Figure 7:
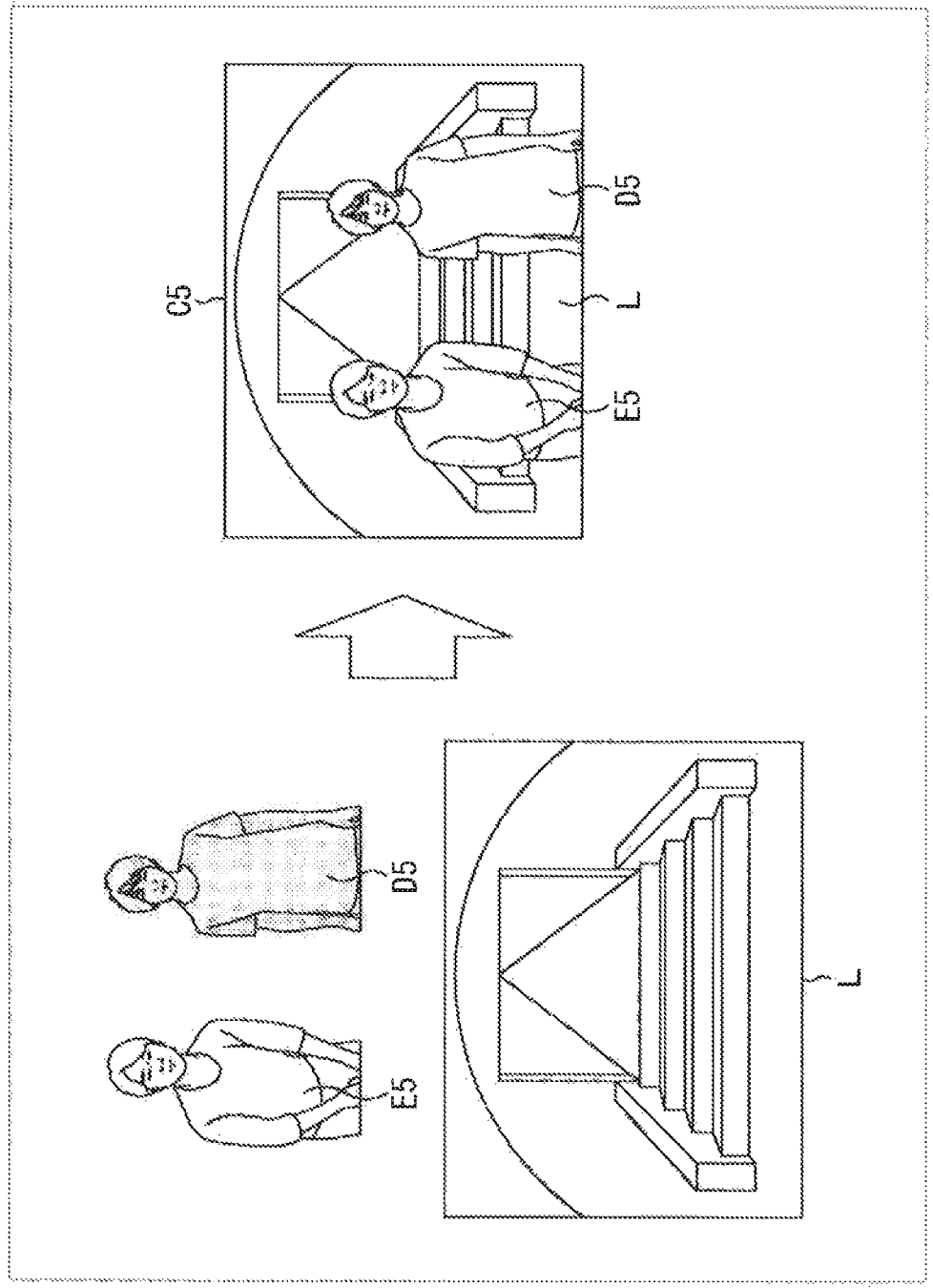
FIG. 7 is a view describing image quality adjusting processing.

In FIG. 7, processing of compositing an imaged performer D5 cut out from an imaged motion picture and a compositing-destination performer E5 cut out from a compositing-destination motion picture into a background still image L to be their background will be described. Shown on the left side of FIG. 7 are the imaged performer 175, the compositing-destination performer E5, and the background still image L. Shown on the right side of FIG. 7 is a composite motion picture C5 in which the imaged performer D5 and the compositing-destination performer E5 have been composited by the compositing processing unit 36 using the background still image L as a background.

For example, in a case where the environments in which the imaged performer D5 and the compositing-destination performer E5 are imaged respectively (the light-source direction, brightness, etc.) are different, the imaged performer D5 and the compositing-destination performer E5 may be different in brightness as illustrated in the drawing. For example, the imaged performer D5 has been imaged in an environment against light to be a dark image as compared with the compositing-destination performer E5. If the imaged performer D5 and the compositing-destination performer E5 are composited as they are, an unnatural composite motion picture in which they are different in brightness will be generated, although not illustrated in the drawing.

Therefore, in the image processing unit 25, the image quality adjusting unit 35 adjusts the white balance of the imaged performer D5 such that the imaged performer D5 and the compositing-destination performer E5 have equivalent brightness. This allows the image processing unit 25 to generate the composite motion picture C5 in which the imaged performer D5 and the compositing-destination performer E5 have been composited into the background still image L at the equivalent brightness to solve unnaturalness. Moreover, the image quality adjusting unit 35 may perform an adjustment relatively such that the imaged performer D5 and the compositing-destination performer E5 have similar brightness. Furthermore, the image quality adjusting unit 35 can adjust such that the imaged performer D5 and the compositing-destination performer E5 become similar in terms of saturation, hue, and the like, besides brightness.

Figure 8:
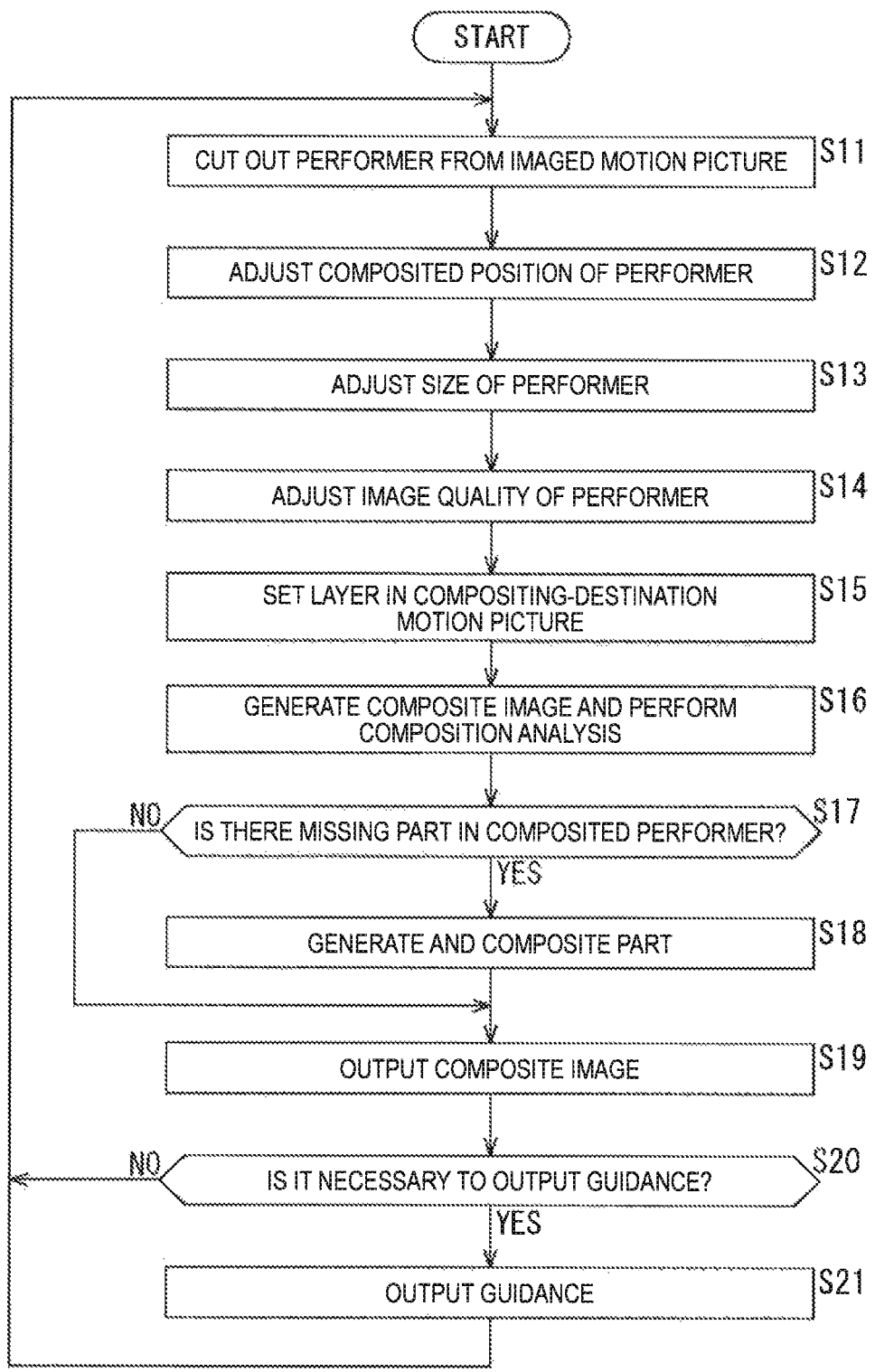
FIG. 8 is a flowchart describing image processing by an image processing unit.

Next, FIG. 8 is a flowchart describing image processing by the image processing unit 25.

For example, the process is started when an operation on an operation unit not illustrated in the drawing is performed so as to composite a performer of the performer-side information processing device 13-1 into a compositing-destination motion picture. In step S11, the cutting-out unit 31 performs image processing of cutting out an area in which an imaged performer appears from an imaged motion picture supplied from the imaging unit 21, and generates a cut-out motion picture of the imaged performer for supply to the size adjusting unit 34.

In step S12, the composited position adjusting unit 32 performs an image analysis on the compositing-destination motion picture supplied from the communication unit 22 to adjust such that a composited position when compositing the cut-out motion picture of the imaged performer into the compositing-destination motion picture becomes an appropriate position, and sets the composited position in the compositing-destination motion picture. Then, the composited position adjusting unit 32 supplies the compositing-destination motion picture in which the composited position has been set to the image quality adjusting unit 35. Moreover, the composited position adjusting unit 32 recognizes the face size of a compositing-destination performer appearing in the compositing-destination motion picture, and notifies the face size of the compositing-destination performer to the size adjusting unit 34.

In step S13, the size adjusting unit 34 adjusts the size of the cut-out motion picture of the imaged performer supplied from the cutting-out unit 31 in step S11 such that the face size of the imaged performer becomes substantially identical to the face size of the compositing-destination performer, and supplies the cut-out motion picture to the image quality adjusting unit 35.

In step S14, the image quality adjusting unit 35 performs image processing of adjusting the image quality of the cut-out motion picture of the imaged performer supplied from the size adjusting unit 34 in step S13 in accordance with the image quality of the compositing-destination performer in the compositing-destination motion picture supplied from the composited position adjusting unit 32 in step S12, and supplies the cut-out motion picture to the compositing processing unit 36.

In step S15, the layer setting unit 33 performs object detection processing on the compositing-destination motion picture supplied from the communication unit 22, and sets, in the compositing-destination motion picture, a layer showing an ahead or behind positional relationship of an object detected from the compositing-destination motion picture with the imaged performer, and supplies the compositing-destination motion picture to the compositing processing unit 36.

In step S16, the compositing processing unit 36 performs compositing processing of compositing the cut-out motion picture of the imaged performer of the image quality adjusted by the image quality adjusting unit 35 in step S14 at the composited position set in the compositing-destination motion picture by the composited position adjusting unit 32 in step S12 in the size adjusted by the size adjusting unit 34 in step S13. At this time, in a case where a layer showing an ahead positional relationship with the imaged performer has been set by the layer setting unit 33 in step S15, the compositing processing unit 36 performs compositing processing of cutting out an object for which the layer has been set from the compositing-destination motion picture and compositing the cut-out motion picture of the imaged performer, and then superimposing an image obtained by cutting out the object. Then, the compositing processing unit 36 performs a composition analysis on a composite motion picture generated by such compositing processing.

In step S17, the compositing processing unit 36 determines whether there is a missing part in the imaged performer composited into the compositing-destination motion picture as described with reference to FIG. 5, on the basis of the result of performing the composition analysis on the composite motion picture in step S16.

In a case where the compositing processing unit 36 determines in step S17 that there is a missing part in the imaged performer, the process proceeds into step S18, and the compositing processing unit 36 requests the part generating unit 37 to generate a part that compensates for the missing part. The part generating unit 37 generates a part by computer graphics in accordance with the request from the compositing processing unit 36 and supplies the part to the compositing processing unit 36. The compositing processing unit 36 generates a composite motion picture in which the part generated by the part generating unit 37 has been composited into the compositing-destination motion picture so as to compensate for the missing part of the imaged performer.

After the processing in step S18, or in a case where the compositing processing unit 36 determines in step S17 that there is no missing part in the imaged performer, the process proceeds into step S19, and the compositing processing unit 36 outputs the composite motion picture to the display 23 for display. Moreover, the compositing processing unit 36 supplies the composite motion picture to the communication unit 22 for transmission to the distribution server 14 via the network 12.

In step S20, the guiding unit 38 analyzes the composite motion picture generated in the compositing processing unit 36, and determines whether it is necessary to output guidance.

In a case where the guiding unit 38 determines in step S20 that it is necessary to output guidance, the process proceeds into step S21, and the guiding unit 38 causes the display 23 to display a guiding image or causes the speaker 24 to output a guiding sound.

After the processing in step S21, or in a case where the guiding unit 38 determines in step S20 that it is not necessary to output guidance, the process returns to step S11, and then, a similar process is repeated.

As described above, the image processing unit 25 can easily generate an image in which performers imaged at different locations have been composited in a balanced manner by adjusting the conditions when compositing the cut-out motion picture of the imaged performer into the compositing-destination motion picture considering such that the position, size, image quality, and the like of the imaged performer and the compositing-destination performer become appropriate.

Note that, for example, in the distribution system 11, it is not necessary to perform all the processing described above in the performer-side information processing device 13-1, but the performer-side information processing device 13-2, for example, may perform an image analysis when imaging a compositing-destination motion picture, and may transmit the compositing-destination motion picture in which a composited position has been set. Similarly, in the performer-side information processing device 13-2, an object appearing in the compositing-destination motion picture may be detected using a distance-measuring technology, and layer setting may be performed. In addition, the performer-side information processing device 13-1 may transmit the cut-out motion picture of the imaged performer to the distribution server 14, and processing of compositing into a compositing-destination motion picture may be performed in the distribution server 14.

Furthermore, for example, image processing by the image processing unit 25 may be carried out in the distribution server 14. That is, the performer-side information processing devices 13-1 and 13-2 transmit motion pictures in which performers have been imaged respectively to the distribution server 14. Then, the distribution server 14 cuts out the performer from the motion picture from the performer-side information processing device 13-1, and performs compositing processing using the motion picture from the performer-side information processing device 13-2 as a compositing-destination motion picture. At this time, the layer setting processing, size adjusting processing, image quality adjusting processing, and part generation processing as described above can be performed in the distribution server 14.

In addition, for example, besides generating a part that compensates for a missing part of the imaged performer by the part generating unit 37, an area to be a missing part of the imaged performer may be trimmed, and a portion of the compositing-destination motion picture may be enlarged to composite the imaged performer.

Note that, in the present embodiment, imaged motion pictures of performers imaged at different locations also include imaged motion pictures obtained by imaging respective performers by different imaging devices at some near distance (for example, in the same room), as well as imaged motion pictures obtained by imaging performers at locations at a physically long distance. Moreover, imaged motion pictures imaged at different imaging times or imaging places even in a case of using an identical imaging device are also included. For example, a compositing-destination motion picture can be imaged in advance and recorded (visually recorded) using an identical imaging device in the same room, and an imaged motion picture in which a performer appears can be composited into a reproduced compositing-destination motion picture during real-time distribution and can be distributed. In this manner, as long as an imaged motion picture and a compositing-destination motion picture are different, they are not limited to those imaged at different locations.

Furthermore, for example, when adjusting the size or image quality of an image, a relative adjustment may be performed on a cut-out motion picture of an imaged performer and a compositing-destination motion picture, besides adjusting the size or image quality of the cut-out motion picture of the imaged performer so as to conform to the compositing-destination motion picture.

It should be noted that each process described referring to the flowchart above includes a process that is not necessarily performed in a time series manner in the order described in the flowchart, but may be performed in a parallel or individual manner (for example, a paralleled process or a process by objects). In addition, the program may be processed by one CPU, or processed by a plurality of CPUs in a distributed manner.

The above-described series of processing (an information processing method) may be performed by hardware or may be performed by software. When the series of processing is performed by software, a program forming the software is installed into a computer that is incorporated in a dedicated hardware, or installed from a program storage medium on which programs are recorded into a general-purpose personal computer, for example, that can perform various types of functions by installing various types of programs.

Figure 9:
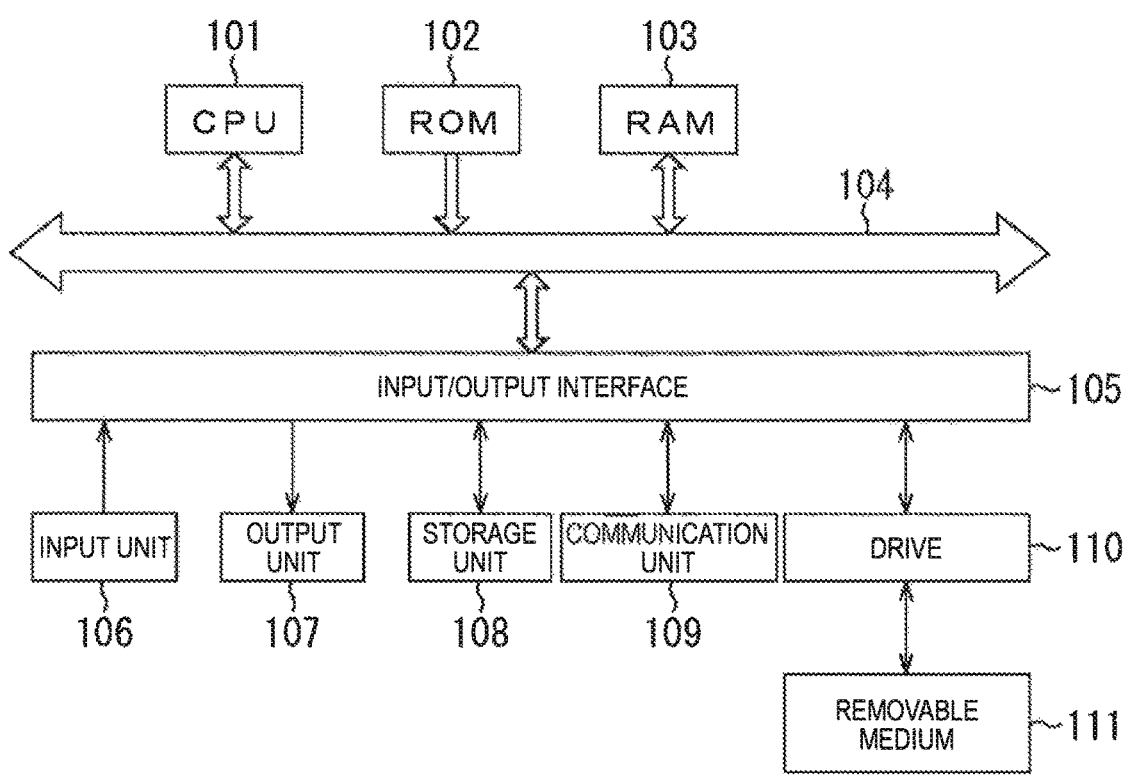
FIG. 9 is a block diagram illustrating an exemplary configuration of an embodiment of a computer applying the present technology.

FIG. 9 is a block diagram illustrating an exemplary hardware configuration of a computer that executes the foregoing series of operations according to a program.

In the computer, a central processing unit (CPU) 101, read-only memory (ROM) 102, and random access memory (RAM) 103 are connected to each other by a bus 104.

Additionally, an input/output interface 105 is connected to the bus 104. Connected to the input/output interface 105 are an input unit 106 that may include devices such as a keyboard, mouse, and microphone, an output unit 107 that may include devices such as a display and one or more speakers, a storage unit 108 that may include devices such as a hard disk and non-volatile memory, a communication unit 109 that may include a device such as a network interface, and a drive 110 that drives a removable medium 111 such as a magnetic disk, optical disc, magneto-optical disc, or semiconductor memory.

In a computer configured as above, the foregoing series of operations are conducted due to the CPU 101 loading a program stored in the storage unit 108 into the RAM 103 via the input/output interface 105 and the bus 104, and executing the program, for example.

The program executed by the computer (CPU 101) may be provided by being recorded onto the removable medium 111 as an instance of packaged media such as magnetic disks (including flexible disks), optical discs (including Compact Disc-Read-Only Memory (CD-ROM) and Digital Versatile Disc (DVD)), magneto-optical discs, or semiconductor memory. Alternatively, the program may be provided via a wired or wireless transmission medium such as a local area network, the Internet, or satellite broadcasting.

Additionally, the program may be installed to the storage unit 108 via the input/output interface 105 by inserting the removable medium 111 into the drive 110. The program may also be received by the communication unit 109 via a wired or wireless transmission medium, and installed to the storage unit 108. Otherwise, the program may be preinstalled in the ROM 102 or the storage unit 108.

Additionally, the present technology may also be configured as below.

(1)

An information processing device including:

an adjusting unit configured to, on the basis of an analysis result of an image analysis obtained by at least one of an image analysis on an area in which a first subject appears included in a first motion picture and an image analysis on a second motion picture different from the first motion picture, adjust a compositing condition for compositing the first motion picture and the second motion picture.

(2)

The information processing device according to (1), in which the image analysis processing unit performs an image analysis of setting, as the analysis result, a position of a second subject appearing in the second motion picture, and on the basis of the position of the second subject in the second motion picture, the adjusting unit adjusts, as the compositing condition, a composited position at which the first motion picture is composited into the second motion picture avoiding the first subject from overlapping the second subject.

(3)

The information processing device according to (1) or (2), in which the image analysis processing unit performs an image analysis of setting, as the analysis result, a size of a second subject appearing in the second motion picture, and on the basis of the size of the second subject in the second motion picture, the adjusting unit adjusts, as the compositing condition, a size of the first motion picture with respect to the second motion picture.

(4)

The information processing device according to (3), in which the image analysis processing unit performs an image analysis of setting, as the analysis result, a face size of a first person appearing in the first motion picture as the first subject and a face size of a second person appearing in the second motion picture as the second subject, and the adjusting unit adjusts the compositing condition such that the face size of the first person becomes substantially identical to the face size of the second person.

(5)

The information processing device according to (3), in which the image analysis processing unit performs an image analysis of setting, as the analysis result, a face size of a first person appearing in the first motion picture as the first subject and a size of a predetermined object appearing in the second motion picture as the second subject, and the adjusting unit adjusts the compositing condition on the basis of a result of comparison between the face size of the first person and the size of the object.

(6)

The information processing device according to any one of (1) to (5), in which the image analysis processing unit performs an image analysis of setting, as the analysis result, an image quality of the first subject and an image quality of a second subject appearing in the second motion picture, and the adjusting unit adjusts the image quality of the first subject and the image quality of the second subject as the compositing condition.

(7)

The information processing device according to any one of (1) to (6), in which the image analysis processing unit performs an image analysis of setting, as the analysis result, a color characteristic in the first subject and a color characteristic in a second subject appearing in the second motion picture, and the adjusting unit adjusts the color characteristic in the first subject and the color characteristic in the second subject as the compositing condition.

(8)

The information processing device according to (7), in which the color characteristic is lightness, and the adjusting unit adjusts lightness of the first subject and lightness of the second subject as the compositing condition.

(9)

The information processing device according to (7) or (8), in which the color characteristic is saturation, and the adjusting unit adjusts saturation of the first subject and saturation of the second subject as the compositing condition.

(10)

The information processing device according to any one of (7) to (9), in which the color characteristic is hue, and the adjusting unit adjusts hue of the first subject and hue of the second subject as the compositing condition.

(11)

The information processing device according to any one of (1) to (10), in which sequentially in accordance with supply of an imaged motion picture obtained by imaging the first subject, an image analysis by the image analysis processing unit and an adjustment of the compositing condition by the adjusting unit are performed to generate a composite motion picture in which the first motion picture and the second motion picture have been composited.

(12)

The information processing device according to any one of (1) to (11), further eluding:

a cutting-out processing unit configured to perform image processing of cutting out an area in which the first subject appears from an imaged motion picture obtained by imaging the first subject to generate the first motion picture.

(13)

The information processing device according to any one of (1) to (12), further including:

a complementary image generation processing unit configured to, in a case where a portion of a body of the first subject is missing when the first motion picture is composited into the second motion picture, perform processing of generating a complementary image that complements the portion; and a compositing processing unit configured to perform compositing processing of compositing the complementary image generated by the complementary image generation processing unit so as to hide the missing portion of the body of the first subject in the second motion picture.

(14)

The information processing device according to any one of (1) to (13), further including:

a layer setting processing unit configured to perform processing of detecting an object appearing in the second motion picture and setting a layer showing an ahead or behind positional relationship of the detected object with the first subject; and a compositing processing unit configured to, in a case where the object for which the layer has been set ahead of the first subject by the layer setting processing unit overlaps the first subject, perform compositing processing of, after compositing the first motion picture into the second motion picture, compositing a motion picture obtained by cutting out the object from the second motion picture.

(15)

The information processing device according to any one of (1) to (14), further including:

an instruction processing unit configured to perform processing of presenting an instruction to a person appearing in the first motion picture as the first subject on the basis of a result of performing an image analysis on a composite motion picture in which the first motion picture and the second motion picture have been composited.

(16)

An information processing method including:

a step of, on the basis of an analysis result obtained by at least one of an image analysis on an area in which a first subject appears included in a first motion picture and an image analysis on a second motion picture different from the first motion picture, adjusting a compositing condition for compositing the first motion picture and the second motion picture.

(17)

A program for causing a computer to execute information processing including:

a step of, on the basis of an analysis result obtained by at least one of an image analysis on an area in which a first subject appears included in a first motion picture and an image analysis on a second motion picture different from the first motion picture, adjusting a compositing condition for compositing the first motion picture and the second motion picture.

Note that the present embodiment is not limited to the embodiment discussed above, and various modifications are possible within a scope that does not depart from the gist of the present disclosure.

REFERENCE SIGNS LIST 11 distribution system
12 network
13-1, 13-2 performer-side information processing device
14 distribution server
15-1 to 15-N viewer-side information processing device
21 imaging unit
22 communication unit
23 display
24 speaker
25 image processing unit
31 cutting-out unit
32 composited position adjusting unit
33 layer setting unit
34 size adjusting unit
35 image quality adjusting unit
36 compositing processing unit
37 part generating unit
38 guiding unit

The invention claimed is:

1. An information processing device comprising:

an image analysis processing unit configured to perform an image analysis of determining, based on an analysis result obtained by an image analysis on an area in which a first subject appears included in a first motion picture and an image analysis on an area in which a second subject appears included in a second motion picture different from the first motion picture, a size of the first subject appearing in the first motion picture and a size of the second subject appearing in the second motion picture, the second motion picture including the second subject and an object;

a layer setting processing unit configured to perform processing of detecting the object appearing in the second motion picture and setting a layer showing an ahead or behind positional relationship of the detected object with the first subject; and an adjusting unit configured to, on the basis of the analysis result and the set layer showing the positional relationship, adjust a plurality of compositing conditions for compositing the first motion picture and the second motion picture, wherein the plurality of adjusted compositing conditions include at least one of the size of the first subject or the size of the second subject, and wherein the image analysis processing unit, the adjusting unit, and the layer setting processing unit are each implemented via at least one processor.

2. The information processing device according to claim 1, wherein the image analysis processing unit is further configured to perform the image analysis of determining, based on the analysis result, a position of the second subject appearing in the second motion picture, and on the basis of the position of the second subject in the second motion picture, the adjusting unit is further configured to adjust a composited position at which the first motion picture is composited into the second motion picture avoiding the first subject from overlapping the second subject.

3. The information processing device according to claim 1, wherein, on the basis of the size of the second subject in the second motion picture, the adjusting unit is further configured to adjust a size of the first motion picture with respect to the second subject in the second motion picture.

4. The information processing device according to claim 3, wherein the image analysis processing unit is further configured to perform the image analysis of determining, based on the analysis result, a face size of a first person appearing in the first motion picture as the first subject and a face size of a second person appearing in the second motion picture as the second subject, and the adjusting unit is further configured to adjust one or more compositing conditions of the plurality of compositing conditions such that the face size of the first person becomes substantially identical to the face size of the second person.

5. The information processing device according to claim 3, wherein the image analysis processing unit is further configured to perform the image analysis of determining, based on the analysis result, a face size of a first person appearing in the first motion picture as the first subject and a size of the object appearing in the second motion picture, and the adjusting unit is further configured to adjust one or more compositing conditions of the plurality of compositing conditions on the basis of a result of comparison between the face size of the first person and the size of the object.

6. The information processing device according to claim 1, wherein the image analysis processing unit is further configured to perform the image analysis of determining, based on the analysis result, an image quality of the first subject and an image quality of the second subject, and the adjusting unit is further configured to adjust at least one of the image quality of the first subject or the image quality of the second subject.

7. The information processing device according to claim 1, wherein the image analysis processing unit is further configured to perform the image analysis of determining, based on the analysis result, a color characteristic in the first subject and a color characteristic in the second subject, and the adjusting unit is further configured to adjust at least one of the color characteristic in the first subject or the color characteristic in the second subject.

8. The information processing device according to claim 7, wherein the color characteristic comprises lightness, and the adjusting unit is further configured to adjust at least one of lightness of the first subject or lightness of the second subject.

9. The information processing device according to claim 7, wherein the color characteristic comprises saturation, and the adjusting unit is further configured to adjust at least one of saturation of the first subject or saturation of the second subject.

10. The information processing device according to claim 7, wherein the color characteristic comprises hue, and the adjusting unit is further configured to adjust at least one of hue of the first subject or hue of the second subject.

11. The information processing device according to claim 1, wherein sequentially in accordance with supply of an imaged motion picture obtained by imaging the first subject, the image analysis by the image analysis processing unit and the adjustment of the plurality of compositing conditions by the adjusting unit are performed to generate a composite motion picture in which the first motion picture and the second motion picture have been composited.

12. The information processing device according to claim 1, further comprising:

a cutting-out processing unit configured to perform image processing of cutting out an area in which the first subject appears from an imaged motion picture obtained by imaging the first subject to generate the first motion picture, wherein the cutting-out processing unit is implemented via at least one processor.

13. The information processing device according to claim 1, further comprising:

a complementary image generation processing unit configured to, in a case where a portion of a body of the first subject is missing when the first motion picture is composited into the second motion picture, perform processing of generating a complementary image that complements the portion; and a compositing processing unit configured to perform compositing processing of compositing the complementary image generated by the complementary image generation processing unit so as to hide the missing portion of the body of the first subject in the second motion picture, wherein the complementary image generation processing unit and the compositing processing unit are each implemented via at least one processor.

14. The information processing device according to claim 1, further comprising:

a compositing processing unit configured to, in a case where the object for which the layer has been set ahead of the first subject by the layer setting processing unit overlaps the first subject, perform compositing processing of, after compositing the first motion picture into the second motion picture, compositing a motion picture obtained by cutting out the object from the second motion picture, wherein the compositing processing unit is implemented via at least one processor.

15. The information processing device according to claim 1, further comprising:

an instruction processing unit configured to perform processing of presenting an instruction to a person appearing in the first motion picture as the first subject on the basis of a result of performing an image analysis on a composite motion picture in which the first motion picture and the second motion picture have been composited, the instruction processing unit is implemented via at least one processor.

16. An information processing method comprising:

performing an image analysis of determining, based on an analysis result obtained by an image analysis on an area in which a first subject appears included in a first motion picture and an image analysis on an area in which a second subject appears included in a second motion picture different from the first motion picture, a size of the first subject appearing in the first motion picture and a size of the second subject appearing in the second motion picture, the second motion picture including the second subject and an object;

performing processing of detecting the object appearing in the second motion picture and setting a layer showing an ahead or behind positional relationship of the detected object with the first subject; and adjusting, on the basis of the analysis result and the set layer showing the positional relationship, a plurality of compositing conditions for compositing the first motion picture and the second motion picture, wherein the plurality of adjusted compositing conditions include at least one of the size of the first subject or the size of the second subject.

17. A non-transitory computer-readable medium having embodied thereon a program, which when executed by a computer causes the computer to execute a method, the method comprising:

performing an image analysis of determining, based on an analysis result obtained by an image analysis on an area in which a first subject appears included in a first motion picture and an image analysis on an area in which a second subject appears included in a second motion picture different from the first motion picture, a size of the first subject appearing in the first motion picture and a size of the second subject appearing in the second motion picture, the second motion picture including the second subject and an object;

performing processing of detecting the object appearing in the second motion picture and setting a layer showing an ahead or behind positional relationship of the detected object with the first subject; and adjusting, on the basis of the analysis result and the set layer showing the positional relationship, a plurality of compositing conditions for compositing the first motion picture and the second motion picture, wherein the plurality of adjusted compositing conditions include at least one of the size of the first subject or the size of the second subject.

18. The information processing device according to claim 1,
wherein the plurality of adjusted compositing conditions include at least one of a resolution of the first motion picture or a resolution of the second motion picture.

* * * * *